US009483625B2

United States Patent
Vijay et al.

(10) Patent No.: US 9,483,625 B2
(45) Date of Patent: Nov. 1, 2016

(54) DELAYED VALIDATION FOR SOFTWARE LICENSING AND ACTIVATION

(71) Applicant: ADOBE SYSTEMS INCORPORATED, San Jose, CA (US)

(72) Inventors: Shyam Sunder Vijay, Fremont, CA (US); Les G. Woolsey, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/922,680

(22) Filed: Oct. 26, 2015

(65) Prior Publication Data

US 2016/0042159 A1 Feb. 11, 2016

Related U.S. Application Data

(63) Continuation of application No. 11/191,346, filed on Jul. 28, 2005, now abandoned.

(51) Int. Cl.
*G06F 21/10* (2013.01)
*H04L 29/06* (2006.01)

(52) U.S. Cl.
CPC .............. *G06F 21/105* (2013.01); *G06F 21/10* (2013.01); *H04L 63/0428* (2013.01); *G06F 2221/0773* (2013.01); *H04L 2463/103* (2013.01)

(58) Field of Classification Search
CPC ..................................................... G06F 21/105
See application file for complete search history.

(56) References Cited

U.S. PATENT DOCUMENTS

| | | | |
|---|---|---|---|
| 5,826,011 A | 10/1998 | Chou et al. | |
| 5,999,741 A | 12/1999 | May et al. | |
| 6,021,492 A | 2/2000 | May et al. | |
| 6,199,082 B1 | 3/2001 | Ferrel et al. | |
| 6,807,580 B2 | 10/2004 | Freeman et al. | |
| 6,915,278 B1 | 7/2005 | Ferrante et al. | |
| 6,993,664 B2 | 1/2006 | Padole et al. | |
| 7,047,411 B1 | 5/2006 | DeMello et al. | |
| 7,130,622 B2 | 10/2006 | Vanska et al. | |
| 7,779,274 B2 | 8/2010 | Dublish et al. | |
| 7,900,246 B1 | 3/2011 | Xu et al. | |
| 7,979,914 B2 | 7/2011 | Millman et al. | |
| 8,819,427 B2 * | 8/2014 | Rowles | H04L 63/0807 709/201 |
| 9,256,719 B2 * | 2/2016 | Berini | G06F 21/32 |
| 9,256,720 B2 * | 2/2016 | Berini | G06F 21/32 |
| 2002/0128976 A1 | 9/2002 | O'Connor et al. | |
| 2002/0198846 A1 | 12/2002 | Lao | |
| 2004/0078211 A1 * | 4/2004 | Schramm-Apple | G06F 19/324 705/2 |
| 2004/0143746 A1 | 7/2004 | Ligeti et al. | |

(Continued)

OTHER PUBLICATIONS

Nordquist et al.; License tracing in free, open, and proprietary software; Published in: Journal of Computing Sciences in Colleges archive vol. 19 Issue 2, Dec. 2003; pp. 101-112; ACM Digital Library.*

(Continued)

*Primary Examiner* — Bradley Holder
(74) *Attorney, Agent, or Firm* — Shook, Hardy & Bacon L.L.P.

(57) ABSTRACT

A method for performing a delayed license validation may include receiving a request to execute a software application. In response to receiving the request to execute the software application, the execution of the software application may be permitted. Subsequent to permitting the execution of the software application, compliance with a license associated with the software application may be determined.

20 Claims, 8 Drawing Sheets

(56) References Cited

U.S. PATENT DOCUMENTS

| | | | |
|---|---|---|---|
| 2005/0182732 A1 | 8/2005 | Miller et al. | |
| 2006/0179042 A1* | 8/2006 | Bram | G06N 5/043 |
| 2006/0224520 A1 | 10/2006 | Vijay | |
| 2012/0293642 A1* | 11/2012 | Berini | G06F 21/32 348/77 |
| 2013/0215275 A1* | 8/2013 | Berini | G06F 21/32 348/150 |
| 2013/0339731 A1* | 12/2013 | Rowles | H04L 63/0807 713/168 |
| 2016/0042620 A1* | 2/2016 | Dandie | G06F 1/28 340/568.3 |

OTHER PUBLICATIONS

Cheon et al.; The software verification and validation process for a PLC-based engineered safety features-component control system in nuclear power plants; Published in: Industrial Electronics Society, 2004. IECON 2004. 30th Annual Conference of IEEE (vol. 1); Date of Conference: Nov. 2-6, 2004; pp. 827-831 vol. 1; IEEE Xplore.*

Non-Final Office Action dated Jun. 23, 2009 in U.S. Appl. No. 11/191,346, 21 pages.

Final Office Action dated Feb. 19, 2010 in U.S. Appl. No. 11/191,346, 23 pages.

Non-Final Office Action dated Oct. 8, 2010 in U.S. Appl. No. 11/191,346, 24 pages.

Final Office Action dated Apr. 1, 2011 in U.S. Appl. No. 11/191,346, 27 pages.

Non-Final Office Action dated Oct. 6, 2011 in U.S. Appl. No. 11/191,346, 29 pages.

Final Office Action dated Apr. 5, 2012 in U.S. Appl. No. 11/191,346, 31 pages.

Examiner's Answer to Appeal Brief dated Jan. 11, 2013 in U.S. Appl. No. 11/191,346, 9 pages.

Patent Board Decision—Examiner Affirmed dated Aug. 25, 2015 in U.S. Appl. No. 11/191,346, 7 pages.

* cited by examiner

DELAYED VALIDATION FOR SOFTWARE LICENSING AND ACTIVATION

CROSS-REFERENCE TO RELATED APPLICATIONS

This application is a continuation of U.S. application Ser. No. 11/191,346, filed Jul. 28, 2005, entitled "Delayed Validation for Software Licensing and Activation," the benefit of priority of which is hereby claimed, and which is incorporated by reference herein in its entirety.

TECHNICAL FIELD

The application relates generally to data processing, and, more particularly, to delayed validation for software licensing and activation.

BACKGROUND

Licensing is an important part of software. Licensing protects the owner of the software from unauthorized use without remuneration. In addition, licensing protects the customer for the software from potential lawsuits because of license misuse. Typically, the license for software is validated at the time of installation and/or execution.

Also, with regard to software, upgrades to hardware may not always keep pace with upgrades to software and vice versa. Customers may upgrade their hardware at a rate that may outpace the upgrades to their software. Accordingly, customers may attempt to transfer their software on existing hardware to their upgraded hardware. However, allowing the ability to transfer must be weighed against massive distribution of a single copy of the software across a number of different machines.

SUMMARY

According to some embodiments, a method, an apparatus and a system perform delayed validation for software licensing and activation. In some embodiments, a method includes receiving a request to execute a software application having a license. The method also includes permitting execution of the software application. The method includes validating the license subsequent to the permitting of the execution of the software application.

In some embodiments, a method includes receiving a number of requests to render a number of templates. The method also includes rendering the number of templates in accessible form. The method also includes validating licenses of the number of templates subsequent to the rendering of the number of templates.

In some embodiments, a method includes performing the following operations, in a server, subsequent to activations of a software application. The operations include determining a total number of activations of the software application. The operations include determining an activation time period for activation of the software application. The operations also include determining a number of activations in the activation time period. The operations include updating an activation counter for the software application if the total number of activations is not equal to the number of activations in the activation time period or if more than one activation of the number of activations in the activation time period is for activation on a same client device.

In some embodiments, a method includes receiving, from a first machine, a request to activate software on the first machine. The method includes activating the software on the first machine in response to a determination that a number of activations for the software is less than a maximum number of allowed activations for the software. The activating of the software includes incrementing an activation counter. The method includes updating the activation counter, at a later time relative to activating the software, based on a number of activations in an activation time period for the software.

In some embodiments, an apparatus includes a machine-readable medium to store a template table. The apparatus also includes a rendering logic to receive a request to render a template. The rendering logic is to render the template. The apparatus also includes a license validation logic to validate a license of the template after the template is rendered based on data stored in the template table.

In some embodiments, an apparatus includes a machine-readable medium to store an activation data structure, wherein an entry in the activation data structure is associated with a serial number of a software product and includes an activation counter. The apparatus also includes an activation logic to receive a request to activate a software product on a device, wherein the activation logic is to allow activation of the software product if a total number of activations of the software product is not greater than a number of allowed activations of the software product, the activation logic to increment the activation counter as part of the activation of the software product. The apparatus includes a counter update logic to recalculate the activation counter, subsequent to the activation of the software product based on an activation time period.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Methods, apparatus and systems for delayed validation for software licensing and activation are described. In the following description, numerous specific details are set forth. However, it is understood that embodiments of the invention may be practiced without these specific details. In other instances, well-known circuits, structures and techniques have not been shown in detail in order not to obscure the understanding of this description. Additionally, in this description, the phrase "exemplary embodiment" means that the embodiment being referred to serves as an example or illustration.

Delayed Validation of a Software License

Some embodiments include delayed validation of a software license. Thus, there is no performance penalty for license validation that may include complex computations. Therefore, in some embodiments, the license is not validated or checked at the time the software is installed or executed. Some embodiments periodically validate license compliance for one to a number of software applications. For example, the license compliance for the software applications may be validated during off-peak times of day (e.g., each night at 12:00 a.m.). In particular, the validation may occur when the number of processing tasks is relatively low. By performing the validation at these times, the system is typically not heavily loaded so the cost of performing the calculations is negligible. In some embodiments, if the software license is not in compliance, an error message may be written to a system log, the user(s) may be notified, the software may not be subsequently executed, etc.

In some embodiments, validation is for templates of documents, forms, etc., which may be modified by users. Whether a template is being modified and the degree of modification may determine whether a license is being used for this template. For example, a number of templates may be accessible for reading and/or modifying. If a template is modified beyond a given level, a license is considered being used. Therefore, if 1000 licenses are available, user(s) may only modify, beyond a certain level, 1000 templates to stay in compliance with the license. In some embodiments, what is being modified within a template and the amount of modification determines whether a license is used. For example, in some embodiments, if a new field is created in the template, a license is considered used. In some embodiments, if a field references a different location in a database for populating that field, a license is considered used. In some embodiments, the modification of a template is determined based on one or more hashes of data within the template.

Figure 1:
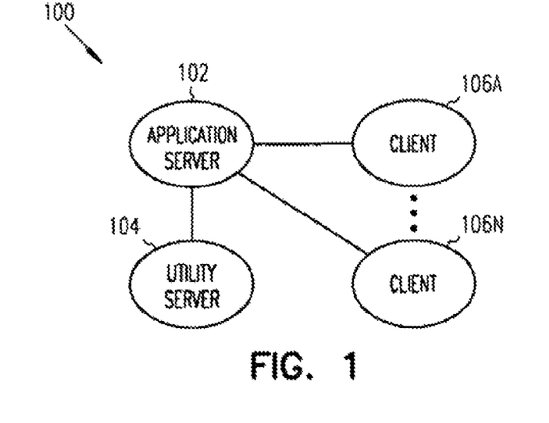
FIG. 1 illustrates a system for delayed validation of a software license, according to some embodiments of the invention.

FIG. 1 illustrates a system for delayed validation of a software license, according to some embodiments of the invention. In particular, FIG. 1 illustrates a system 100 that includes an application server 102, a utility server 104 and client machines 106A-106N. The client machines 106A-106N may be representative of any apparatus, computer device, etc. For example, the client machines 106A-106N may be a desktop computer, notebook computer, Personal Digital Assistant (PDA), a cellular telephone, etc.

The client machines 106A-106N are coupled to the application server 102. The application server 102 is coupled to the utility server 104. The client machines 106A-106N, the application server 102 and the utility server 104 may be coupled together in a number of different network configurations. For example, some embodiments may be incorporated into a distributed or peer-to-peer architecture system. The client machines 106A-106N, the application server 102 and the utility server 104 may be part of different types of networks including a Local Area Network, Wide Area Network, etc. For example, the network may be the Internet, an Intranet network, an Ethernet-based network, etc.

In some embodiments, the client machines 106A-106N may be executing different types of software applications. For example, the client machines 106A-106N may be executing different types of business software. As part of the execution of the software, the client machines 106A-106N may access the application server 102. For example, the client machines 106A-106N may be accessing (including reading and modifying) templates for forms, documents, etc. as part of the execution of business software. In some embodiments, the client machines 106A-106N may modify templates that are to be rendered into a Portable Document Format (PDF). Therefore, the client machines 106A-106N may transmit templates to the application server 102 for rendering. Alternatively, the client machines 106A-106N may request rendering of a template already stored thereon. The application server 102 may transmit the templates to the utility server 104 to perform the rendering. Moreover, the utility server 104 may perform a delayed validation of the license for the template, as further described below.

Figure 2:
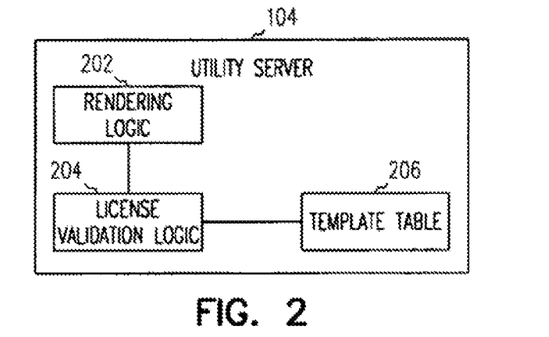
FIG. 2 illustrates a more detailed block diagram of a server on which delayed validation of a software license is performed, according to some embodiments of the invention.

FIG. 2 illustrates a more detailed block diagram of a server on which delayed validation of a software license is performed, according to some embodiments of the invention. In particular, FIG. 2 illustrates a more detailed block diagram of the utility server 104 of FIG. 1, according to some embodiments of the invention. The utility server 104 includes a rendering logic 202, a license validation logic 204 and a template table 206. The rendering logic 202 is coupled to the license validation logic 204. The license validation logic 204 is coupled to the template table 206.

The rendering logic 202 and the license validation logic 204 may be representative of software, hardware, firmware or a combination thereof. For example, the rendering logic 202 and the license validation logic 204 may be software to be executed on a processor (not shown). An example of the utility server 104 having this architecture is described in FIG. 12 below. The template table 206 may be representative of any type of data structure that may be stored in a machine-readable medium.

Figure 3:
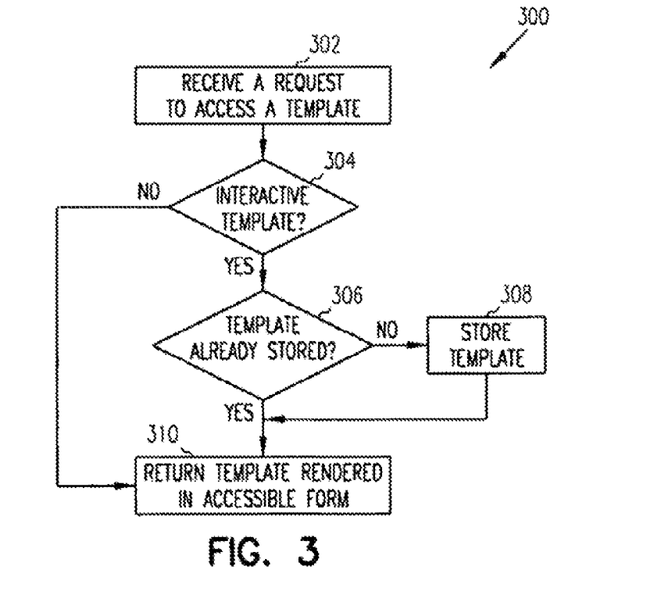
FIG. 3 illustrates a flow diagram for rendering a document based on a template, which is later validated on whether a software license was used for the template, according to some embodiments of the invention.

A more detailed description of the operations for delayed validation of a software license, according to some embodiments, is now described. FIG. 3 illustrates a flow diagram for rendering a document based on a template, which is later validated on whether a software license was used for the template, according to some embodiments of the invention. The flow diagram 300 illustrates the operations of the utility server 104 and is described with reference to FIGS. 1 and 2.

At block 302, the rendering logic 202 receives a request to access a template. The request may be received from the application server 102 based on a request from one of the client machines 106. For example, a user of the client machine 106A may be modifying a template using business software that is part of the application server 102. The flow continues at block 304.

At block 304, the license validation logic 204 determines whether the template is interactive. In some embodiments, a template is considered interactive if the result of the rendering operations is a form (e.g., a PDF form) that may be used or data captured. For example, the template is interactive if a user may enter data into fields or if a user may digitally sign the template. The template is also interactive if a user can modify which entry in a database is associated with a field in the template. Upon determining that the template is not interactive, the flow continues at block 310, which is described in more detail below. Upon determining that the template is interactive, the flow continues at block 306.

At block 306, the license validation logic 204 determines whether a copy of the template is already stored in the template table 206. Upon determining that the template is already stored in the template table 206, the flow continues at block 310, which is described in more detail below. Upon determining that the template is not already stored in the template table 206, the flow continues at block 308.

At block 308, the license validation logic 204 stores a copy of the template in the template table 206. A copy of the template is stored because the template is subsequently used to perform the delayed validation of the license. In some embodiments, the data of the template includes one or more hashes. As further described below, based on whether the one or more hashes have been modified and the level of modification, the license validation logic 204 determines whether a license is used for the template access. The flow continues at block 310.

At block 308, the rendering logic 202 returns the template as rendered in accessible form. For example, the rendering logic 202 may render a PDF document based on the template.

Figure 4:
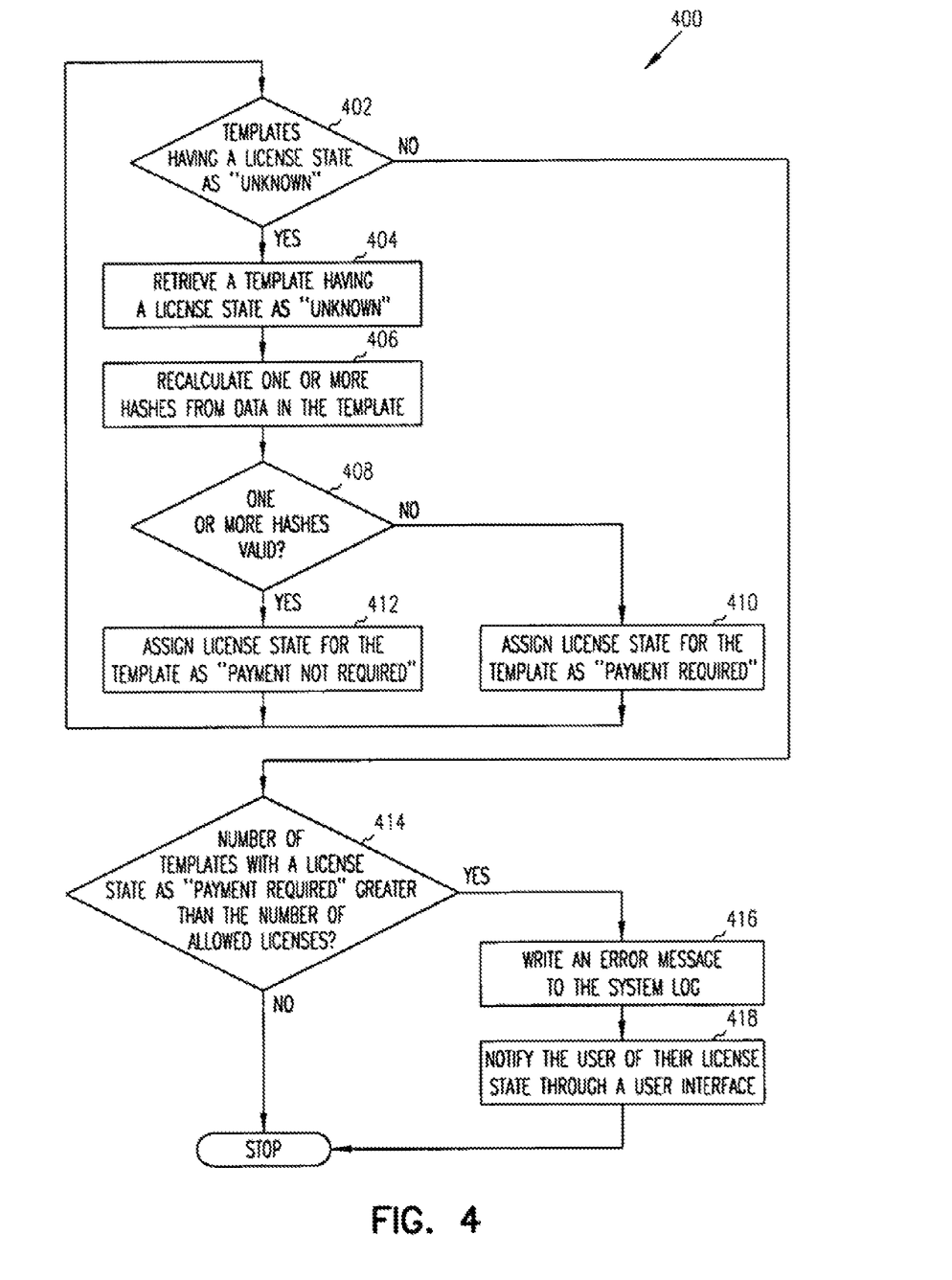
FIG. 4 illustrates a flow diagram for delayed validation of a software license, according to some embodiments of the invention.

A more detailed description of the operations for validation of a software license, according to some embodiments, is now described. FIG. 4 illustrates a flow diagram for delayed validation of a software license, according to some embodiments of the invention. The flow diagram 400 illustrates the operations of the utility server 104 and is described with reference to FIGS. 1 and 2. In some embodiments, the operations of the flow diagram 400 are performed subsequent to the operations of the flow diagram 300. For example, the license validation may be performed during off-peak times of the day (e.g., each night at 12:00 a.m.).

At block 402, the license validation logic 204 determines whether any of the templates stored in the template table 206 have a license state of "unknown". In some embodiments, the license state may be defined as "unknown", "payment required" or "payment not required." In some embodiments, the license validation logic 204 sets the license state to "unknown" when the template is initially copied into the template table 206. After validation, the license state is either set to "payment required" or "payment not required", as further described below. Upon determining that there are no templates having a license state set to "unknown", the flow continues at block 414, which is described in more detail below. Upon determining that there is at least one template having a license state set to "unknown", the flow continues at block 404.

At block 404, the license validation logic 204 retrieves a template having a license state that is "unknown" from the template table 206. The flow continues at block 406.

At block 406, the license validation logic 204 recalculates one or more hashes from data in the template. In particular, the data representative of hashes may be incorporated into the data of the template. The templates stored in the template table 206 may be received from clients 106A-106N that may modify parts of the templates. The license validation logic 204 may recalculate the one or more hashes stored in the data of the template to determine what types and level of modifications were made by the clients 106A-106N.

In some embodiments, one or more hashes are modified if substantive modifications are made to the template. Moreover, in some embodiments, hashes are not modified if aesthetic modifications are made to the template. A substantive modification may include the adding of a new field to the template. Another substantive modification may include modifying which location in a database that a field references for populating the field. Aesthetic modifications may include changes to color, font, logos, etc. In some embodiments, if substantive modifications are made, the template is considered sufficiently modified such that a license is considered exercised for this template. The flow continues at block 408.

At block 408, the license validation logic 204 determines whether the one or more hashes are valid. The license validation logic 204 may compare the recalculated hashes with the hashes of the template, original and unmodified by the clients 106A-106N. If there are differences between the associated hashes for a given template, the hash is not considered valid. Upon determining that the one or more hashes are not valid, the flow continues at block 410. Upon determining that the one or more hashes are valid, the flow continues at block 412.

At block 410, the license validation logic 204 assigns the license state for the template as "payment required". The license validation logic 204 may update this attribute for the template in the template table 206. In particular, because substantive modifications were made to the template, the license validation logic 204 marks this template as exercising a license. The flow continues at block 402.

At block 412, the license validation logic 204 assigns the license state for the template as "payment not required". The license validation logic 204 may update this attribute for the template in the template table 206. In particular, because no substantive (possibly only aesthetic) modifications were made to the template, the license validation logic 204 marks this template as not exercising a license. The flow continues at block 402.

At block 414, the license validation logic 204 determines whether the number of templates with a license state as "payment required" is greater than the number of allowed licenses. The number of allowed licenses may be for one to a number of different clients 106. For example, the clients 106 may purchase N number of licenses. Accordingly, the clients 106 may be able to substantively modify N number of templates. Upon determining that the number of templates with a license state as "payment required" is not greater than the number of allowed licenses, the operations of the flow diagram 400 are then complete. Upon determining that the number of templates with a license state as "payment required" is not greater than the number of allowed licenses, the flow continues at block 416.

At block 416, the license validation logic 204 writes an error message to a system log. The system log may be stored in the application server 102 or the utility server 104. An administrator of the system may have access to the system log. Accordingly, if the number of licenses is exceeded, the administrator is notified through the system log. The flow continues at block 418.

At block 418, the license validation logic 204 notifies the administrator that the number of licenses that have been exercised has exceeded the allowed limit, through a user interface. The license validation logic 204 may also notify the administrator through email, etc. In some embodiments, the license validation logic 204 may deny future requests for rendering of templates in accessible form until the number of licenses is increased. The operations of the flow diagram 400 are complete.

Delayed Validation of a Software Activation

Some embodiments include delayed validation of a software activation. In some embodiments, the delayed validation of the software activation is based on an activation time period. In some embodiments, copies of software products or a suite of software products may include a limited license based on a serial number. In other words, a copy of a software product may not be activated on an unlimited number of machines. A suite of software products may include one or more software products. While a copy of a software product or suite of software may be installed on any of a number of machines, in some embodiments, the copy of a software product or suite of software may only be activated on a limited number of machines. An activation may require communication with a server over a network prior to execution of the software. The activation may be based on a serial number and other data that uniquely identifies the machine (such as a machine disk identifier (MDI) that uniquely identifies a hard disk drive of the machine on which the software is activated). In some embodiments, an activation may be transferred to different machines. For example, if customers purchase a new machine, the customers may transfer the activation from an old machine to this new one.

Some embodiments incorporate an activation time period in the deactivation and activation of a copy of a software product. For example, the activation time period may be a period of time starting from the present and looking back a given period (e.g., three months, six months, 12 months, etc.). For a six-month activation time period, if an activation or deactivation occurs on July 1, the activation time period is from July 1 back to January 1 of the same year. In some embodiments, the limited activations are relative to the activation time period. For example, if two activations are allowed for a given software product, two activations are available in the activation time period. The given software product may have more activations beyond the activation time period. Such embodiments provide a trade-off between limiting the number of activations versus the processing of a large amount of customer service calls regarding the activation.

For example, assume that two activations are allowed for a given copy of a software product and that there is a six-month activation time period. After purchasing a copy of a software product, a user typically attempts to install the copy on a first machine and on a second machine, which is allowed. Shortly thereafter, if the user attempts to install the copy on a third machine, the activation is denied. If the user attempts to install the copy on a third machine eight months later, it is assumed that the user has upgraded their hardware because of the length of time. In other words, it is assumed the copy of the software product is actually only being executed on two machines because of this upgrade. Therefore, the third activation is allowed because the activation is outside the activation time period. Accordingly, activations beyond the limited number are allowed outside the activation time period in exchange for a reduction in the number of customer service calls. In other words, based on a cost-benefit analysis, the cost would be that the copy of the software product is activated outside the activation time period. The benefit is the reduction in the number of customer service calls from users attempting to activate on new hardware outside the activation time period. The number of activations for a software application may be tracked using an activation counter.

Thus, if a software application is activated, the activation counter is incremented, and if a software application is deactivated, the activation counter is decremented. Some embodiments delay the updating of an activation counter relative to the activation time period off-line relative to the activations and deactivations. For example, the activation counter may be updated for one to a number of software applications each night at midnight.

Figure 5:
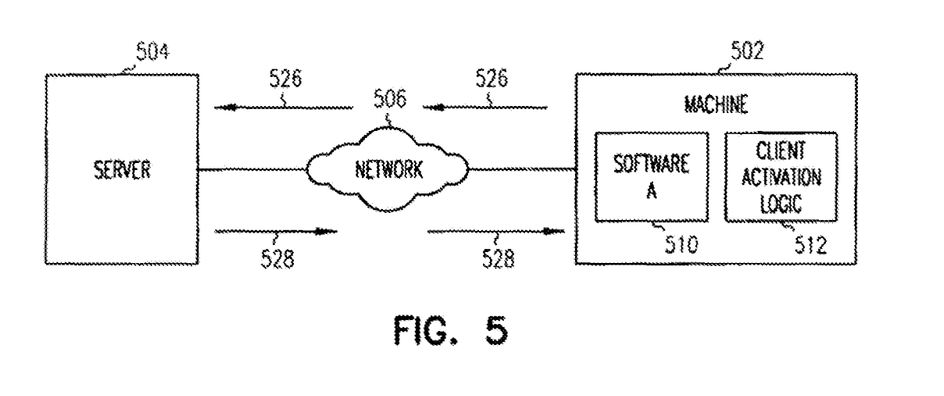
FIG. 5 illustrates a system for delayed validation of software activation based on an activation time period, according to some embodiments of the invention.

FIG. 5 illustrates a system for delayed validation of software activation based on an activation time period, according to some embodiments of the invention. In particular, FIG. 5 illustrates a system 500 that includes a machine 502 that is coupled to a server 504 through a network 506. The machine 502 may be representative of any apparatus, computer device, etc. For example, the machine 502 may be a desktop computer, notebook computer, Personal Digital Assistant (PDA), a cellular telephone, etc. The machine 502 includes a software product A 510 that has been installed thereon. The machine 502 also includes a client activation logic 512. The client activation logic 512 may be representative of software, hardware, firmware or a combination thereof. For example, the client activation logic 512 may be software to be executed on a processor (not shown). An example of the machine 502 having this architecture is described in FIG. 5 below.

A more detailed description of an architecture of the machine 502 and/or the server 504, according to some embodiments, is set forth below. While FIG. 5 employs a client-server architecture, embodiments are not limited to such an architecture. For example, some embodiments may be incorporated into a distributed or peer-to-peer architecture system. The network 506 may be different types of networks including a Local Area Network, Wide Area Network, etc. For example, the network 506 may be the Internet, an Intranet network, an Ethernet-based network, etc.

FIG. 5 also includes a number of operations that may be part of the activation of the software product A 510. The operations include an activation operation 526 and an activation result operation 528. The activation operation 526 is an operation to activate the software product A 510 on the machine 502. In some embodiments, the activation operation 526 may be based on a user of the machine 502 attempting to activate the software product A 510. In some embodiments, a copy of the software product A 510 may only be activated on a limited number of machines. Activation and deactivation of software products on machines are performed based on communications with the server 504. As further described below, logic within the server 504 limits the number of activations for a copy of a software product using a license number of the software and a unique identification of the machines. The logic within the server 504 accepts or denies activation of a copy of a software product based on the number of activations in a given activation time period. An activation time period is a period that is between the present time and a point in the past. In some embodiments, an activation counter is used to track the number of activations for a given software application/product. In some embodiments, logic in the server 504 may delay (relative to the activation operation) updates to the activation counter based on the activation time period.

The logic within the server 504 receives the activation operation 526 and determines whether to perform the activation of the software product A 510. The result of this determination is the activation result operation 528. In particular, the logic within the server 504 returns a result of the activation back to the machine 502. In some embodiments, the result may be an acceptance or denial of the attempt to perform the activation.

Figure 6:
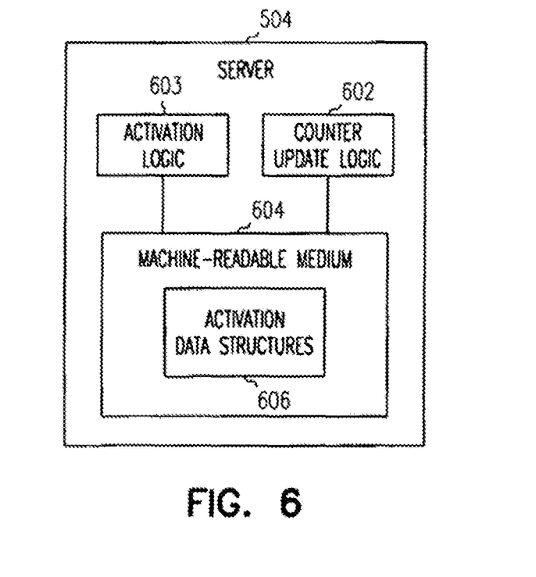
FIG. 6 illustrates a more detailed block diagram of a server that includes delayed validation of software activation based on an activation time period, according to some embodiments of the invention.

FIG. 6 illustrates a more detailed block diagram of a server that includes delayed validation of software activation based on an activation time period, according to some embodiments of the invention. In particular, FIG. 6 illustrates a more detailed block diagram of the server 504 of FIG. 5. As shown, the server 504 includes a counter update logic 602, an activation logic 603 and a machine-readable medium 604. The machine-readable medium 604 stores activation data structures 606. The activation data structures 606 may be tables, objects, data arrays, etc. The counter update logic 602 and the activation logic 603 may be representative of software, hardware, firmware or a combination thereof. For example, the counter update logic 602 and the activation logic 603 may be software to be executed on a processor (not shown). An example of the server 504 having this architecture is described in FIG. 9 below.

The activation logic 603 may track activations/deactivations based on a unique identification of the machine or a component therein. For example, in some embodiments, the unique identification may be a machine disk identifier. The machine disk identifier is a value that is calculated based on information related to the hard disk drive (e.g., identifications of sectors or tracks of the hard disk drive). The activation logic 603 may also track activations/deactivations based on an identification of a processor of the machine, the amount of memory, etc. In some embodiments, the activation logic 603 may also track activations/deactivations based on any combination of those identifications listed above. The activation logic 603 may store these unique identifications along with a unique serial number for the license of the software product into the activation data structures 606. The counter update logic 602 may perform delayed updates (relayed to activation of software) to activation counters stored in the deactivation data structures 606 for one or more licenses of such software.

Figure 7:
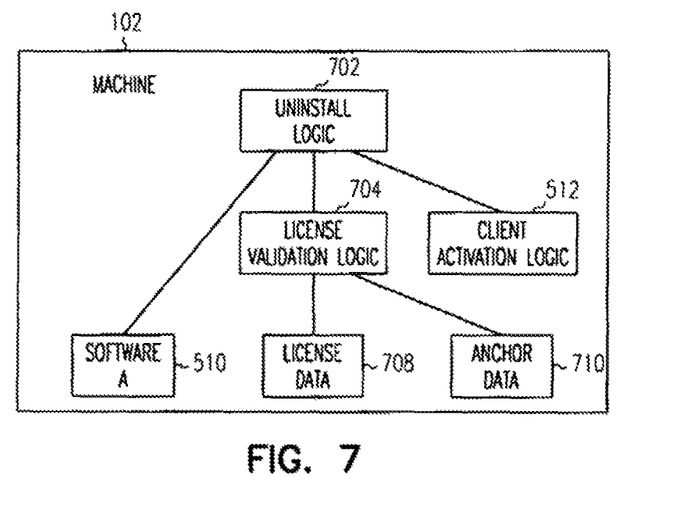
FIG. 7 illustrates a more detailed block diagram of a machine that includes logic to perform software uninstallation that integrates transfer activation, which updates the activation counter, according to some embodiments of the invention.

FIG. 7 illustrates a more detailed block diagram of a machine that includes logic to perform software uninstallation that integrates transfer activation, which updates the activation counter, according to some embodiments of the invention. In particular, FIG. 7 illustrates a more detailed block diagram of the machine 502 of FIG. 5. In addition to the software product A 110 and the client activation logic 512, the machine 502 includes an uninstall logic 702; a license validation logic 704, license data 708 and anchor data 710. The uninstall logic 702 and the license validation logic 704 may be representative of software, hardware, firmware or a combination thereof. For example, the uninstall logic 702 and the license validation logic 704 may be software to be executed on a processor (not shown). An example of the machine 102 having this architecture is described in FIG. 12 below. The machine also includes license data 708 and anchor data 710, which may be files, data stored as part of a file, etc. The anchor data 710 may include data indicating the time when the software product was installed on the machine 102. The anchor data 710 may also include data related to activation (whether the software product is activated, when activated, etc.).

Figure 8:
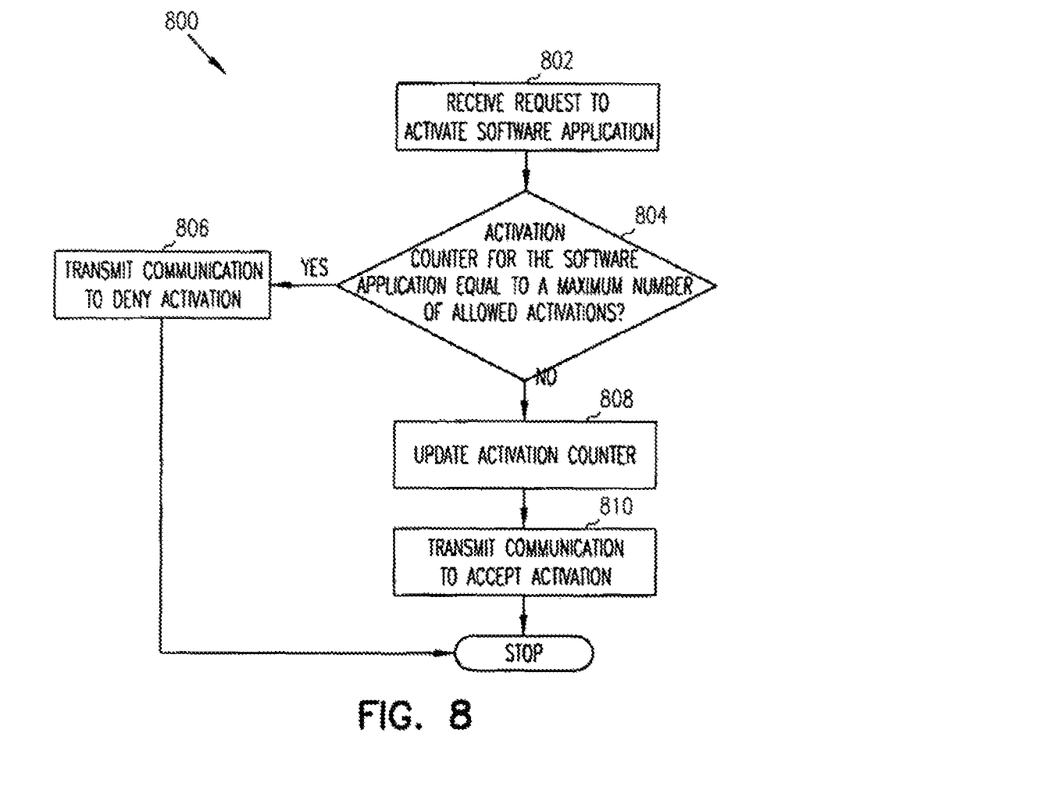
FIG. 8 illustrates a flow diagram for software activation, according to some embodiments of the invention.

A more detailed description of the operations for software activation and delayed updates to the counter for software activation is now described. FIG. 8 illustrates a flow diagram for software activation, according to some embodiments of the invention. The flow diagram 800 illustrates the operations of the activation logic 603.

At block 802, the activation logic 603 receives a request to activate a software application. With reference to FIG. 5, the client activation logic 512 transmits the request. The flow continues at block 804.

At block 804, the activation logic 603 determines whether an activation counter for the software application equals to a maximum number of allowed activations. The activation logic 603 may retrieve an entry from the activation data structures 606 that is associated with the software application based on a serial number. The entry may include the activation counter and the maximum number of allowed activations for the software application. Upon determining that the activation counter for the software application equals a maximum number of allowed activations, the flow continues at block 806. Upon determining that the activation counter for the software application does not equal a maximum number of allowed activations, the flow continues at block 808, which is described in more detail below.

At block 806, the activation logic 603 transmits a communication back to the machine 502 that indicates that the activation was denied. Therefore, the activation logic 603 does not update the activation counter for this software. The flow continues at block 808.

At block 808, the activation logic 603 updates the activation counter for the software application. In particular, the activation logic 603 increments the activation counter to account for the new activation. The flow continues at block 810.

At block 810, the activation logic 603 transmits a communication back to the machine 502 that the activation was accepted. The operations of the flow diagram 800 are complete.

Figure 9:
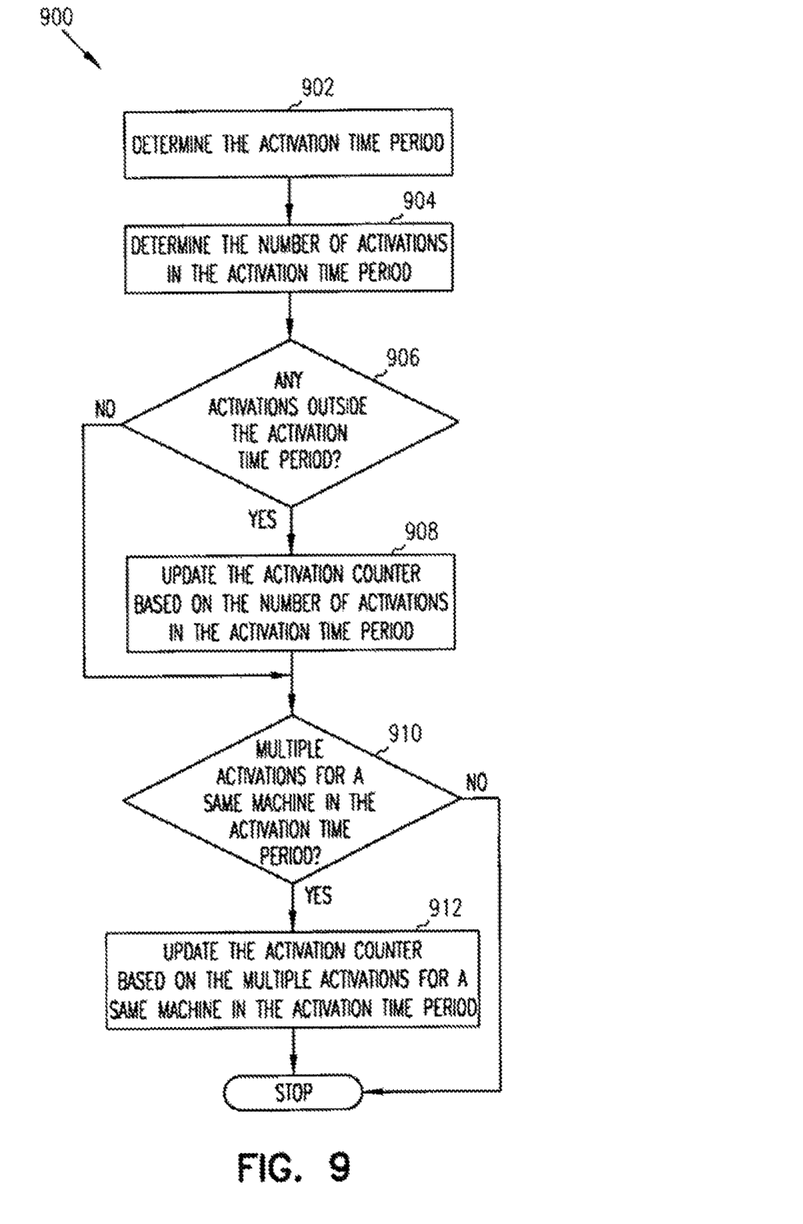
FIG. 9 illustrates a flow diagram for delayed updates to the counter for software activation, according to some embodiments of the invention.

A more detailed description for delayed operations (relative to the software activation) for updating the activation counter for software activation is now described. In particular, the activation counter for software activation may be updated based on an activation time period, subsequent to the activation described in the flow diagram 800 of FIG. 8. FIG. 9 illustrates a flow diagram for delayed updates to the counter for software activation, according to some embodiments of the invention. The flow diagram 900 illustrates the operations of the counter update logic 602. In some embodiments, these operations may be performed periodically and during an off-peak time of day. For example, these operations may be performed once a night at 12:00 a.m. While described with reference to updating the activation counter for one software application, in some embodiments, the counter update logic 602 performs these operations for any of a number of software applications. For example, in some embodiments, the counter update logic 602 may update all of the activation counters (for the different software applications) stored in the activation data structures 606.

At block 902, the counter update logic 602 determines the activation time period for the software application. The activation time period may be stored in the entry in the activation data structures 606 associated with the software application. As described above, the activation time period may be a time period starting from the present and looking back a given period (e.g., three months, six months, 12 months, etc.). The flow continues at block 904.

At block 904, the counter update logic 602 determines the number of activations in the activation time period. The counter update logic 602 may determine this number based on the data stored in the activation data structures 606. The activation logic 603 may store the date of activation for each machine for a given serial number of a software application. The flow continues at block 906.

At block 906, the counter update logic 602 determines whether there are any activations outside the activation time period. In particular, if any activations are outside the activation time period, the counter update logic 602 needs to update the activation counter for this software application. Upon determining that there are no activations outside the activation time period, the flow continues at block 910, which is described in more detail below. Upon determining that there are activations outside the activation time period, the flow continues at block 908.

At block 908, the counter update logic 602 updates the activation counter based on the activation time period. In particular, the activation counter may include activations outside the activation time period. In some embodiments, the activation logic 603 updates the activation counter independent of the activation time period (as shown in FIG. 8). Accordingly, the time to complete the activation is less (in comparison to if the activation logic 603 included the activation time period in the determination of activation shown in FIG. 8). Therefore, the counter update logic 602 updates the number of activation based on the number of activations in the activation time period. For example, if five activations were performed in the activation time period and if four activations were outside the activation time period, the activation logic 603 would have set the activation counter to nine (based on the operations in FIG. 8). Therefore, the counter update logic 602 sets the activation counter to five (based on the activation in the activation time period). The flow continues at block 910.

At block 910, the counter update logic 602 determines whether there are multiple activations for a same machine in the activation time period. The counter update logic 602 may make this determination based on the data stored in the table in the activation data structures 606 for this software application. The table may store the identification of the machines on which the activation is performed. Upon determining that there are no multiple activations for a same machine in the activation time period, the operations of the flow diagram 900 are complete. Upon determining that there are multiple activations for a same machine in the activation time period, the flow continues at block 912.

At block 912, the counter update logic 602 updates the activation counter based on the multiple activations for a same machine in the activation time period. For example, if the same machine was updated 20 times in the activation time period, the counter update logic 602 marks this as only a single activation. Thus, in some embodiments, for each unique machine activated in the activation time period, the counter update logic 602 increments the activation counter by one. The operations of the flow diagram 900 are complete.

Figure 10:
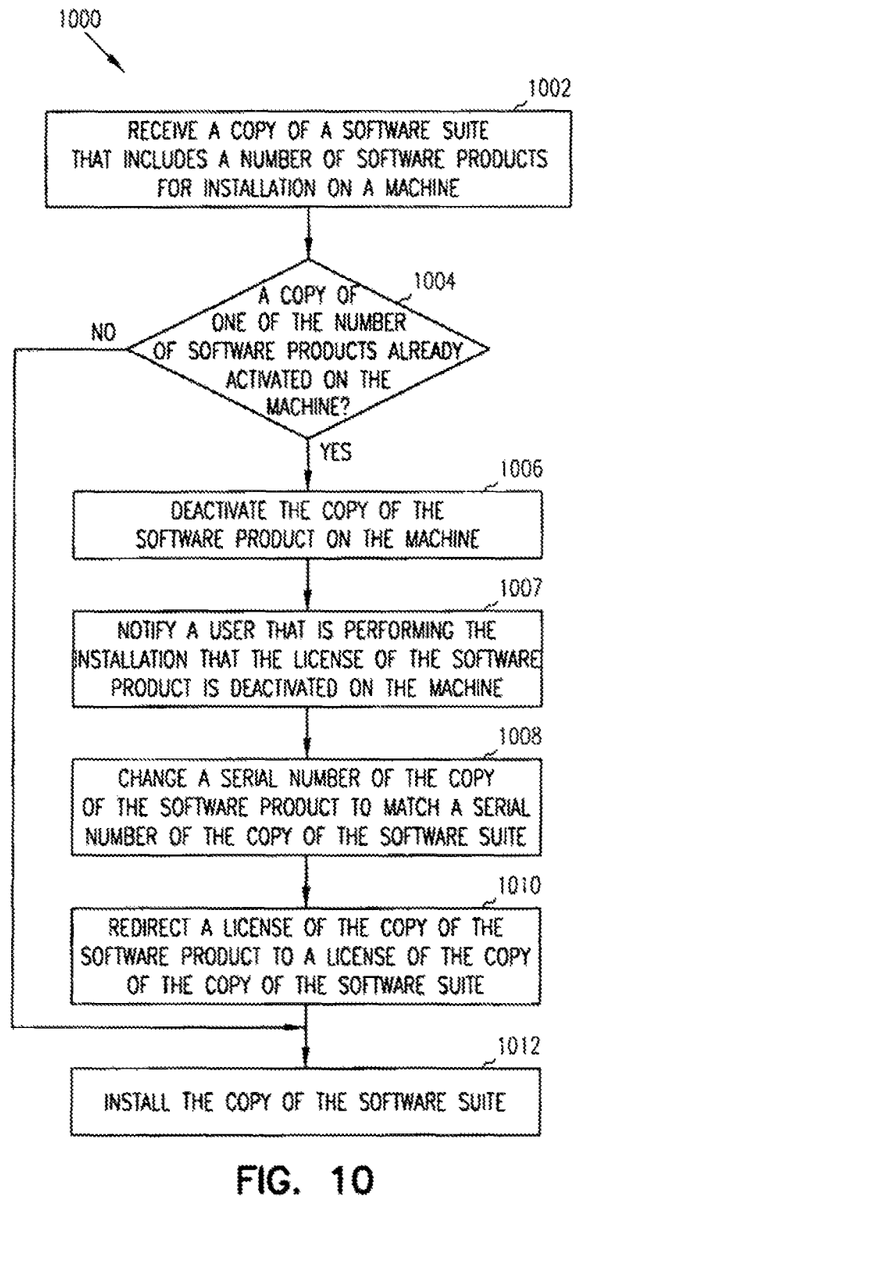
FIG. 10 illustrates a flow diagram for software suite activation, according to some embodiments of the invention.

A more detailed description of deactivation of a software product based on a software suite activation, which updates the activation counter, according to some embodiments, is now described. A delayed update of the activation counter may then be performed based on the operations shown in the flow diagram 900 of FIG. 9. In particular, FIG. 10 illustrates a flow diagram for software suite activation, according to some embodiments of the invention. The flow diagram 1000 illustrates the operations for activating a software suite having a number of individual software products on a machine. Moreover, such operations are described wherein a copy of one of the individual software products is already activated on the machine. Such operations may be performed for a greater number of activated individual software products. The flow diagram 1000 is described with reference to the components of FIGS. 5-7. The flow diagram 1000 commences at block 1002.

Figure 12:
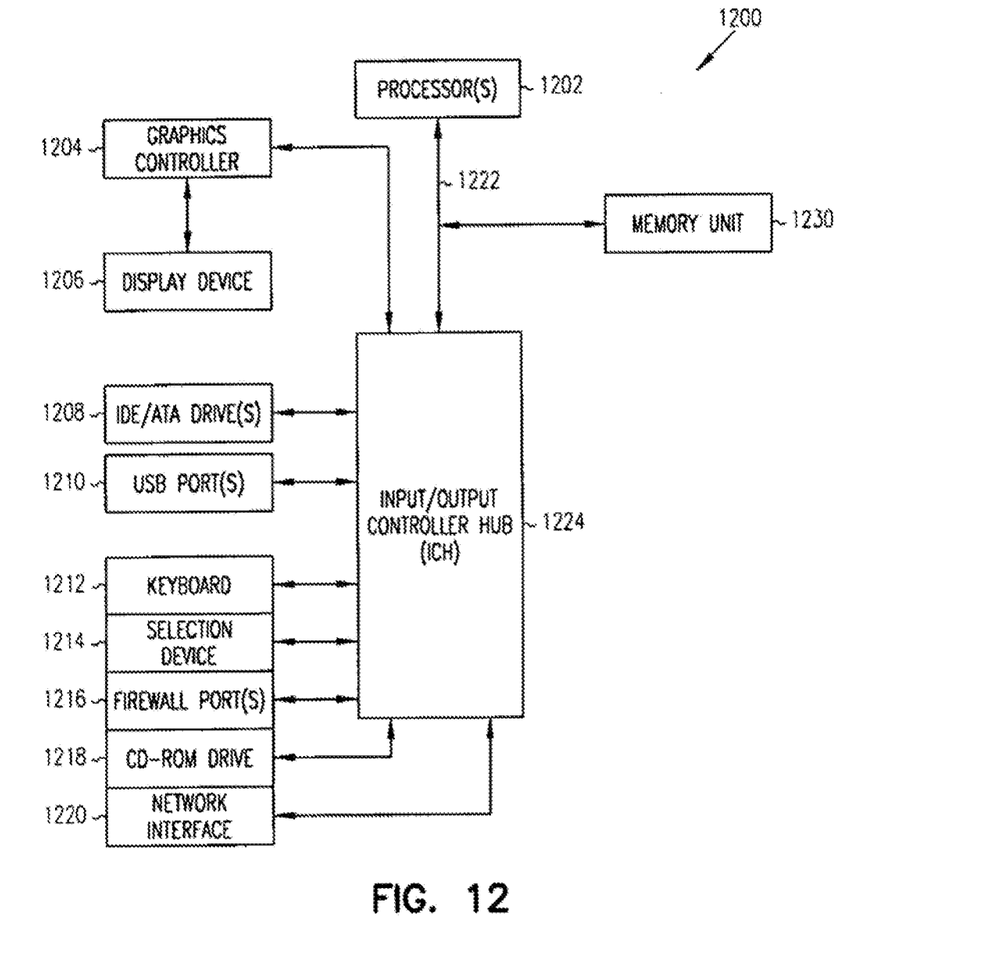
FIG. 12 illustrates a computer device that executes software for performing operations related to delayed validation for software licensing and activation, according to some embodiments of the invention.

At block 1002, the client activation logic 512 of a machine may receive a copy of a software suite (that includes a number of software products) for installation on the machine. The machine 502 may include an input/output logic for receiving the copy of the software suite for installation. Examples of different I/O logic are shown in FIG. 12 that is described below. The flow continues at block 1004.

At block 1004, the client activation logic 512 determines whether a copy of one of the number of software products is already activated on the machine. In some embodiments, the client activation logic 512 may make this determination based on the existence of a file stored on the hard disk drive of the machine 502, the setting of a flag in a file that is part of the installation of the software product, etc. In some embodiments, the client activation logic 512 may make this determination based on a query to the activation logic 603 on the server 504 over the network 506. Upon determining that a copy of one of the number of software products is not already activated on the machine 502, the flow continues at block 1012, which is described in more detail below.

At block 1006, upon determining that a copy of one of the number of software products is already activated on the machine 502, the client activation logic 512 deactivates the copy of the software product on the machine 502. The client activation logic 512 communicates a deactivation message to the activation logic 603 of the server 504. The activation logic 603 of the server 504 may deactivate the license of the copy of the software product A 510 for the machine 502. For example, the activation logic 603 may update a data structure for the software product in the activation data structures 606. In some embodiments, based on the deactivation, the activation logic 603 decrements the activation counter within the data structure for this software product. Accordingly, even if the license of copy of the software product A 510 has a limited number of activations, the copy may be activated on a different machine. Therefore, the individual copy of the software product is not adopted by the software suite prior to deactivation, thereby allowing for reuse of the license of the software product A 510. The flow continues at block 1007.

At block 1007, the client activation logic 512 notifies a user that is performing the installation of the software suite that the license of the software product A 510 is now deactivated on the machine 502. The client activation logic 512 may also notify the user that the license is now available for use on a different machine. This notification may be through a pop-message during the activation, an email message, a telephone call, etc. The flow continues at block 1008.

At block 1008, the client activation logic 512 changes a serial number of the copy of the software product A 510 to match a serial number of the copy of the software suite. The serial numbers may be stored in one or more locations in files in storage on the machine 502. Accordingly, the client activation logic 512 updates the serial number in those locations. The flow continues at block 1010.

At block 1010, the client activation logic 512 redirects a license of the copy of the software product A 510 to a license of the copy of the software suite. The client activation logic 512 may perform this redirection based on creation of a file, setting a flag in a file, etc. Therefore, if a change is to occur to a license of the software suite, the same change will be made to the license of the copy of the software A product 510 and vice versa. Logic that is to make changes to the license may be updated accordingly. For example, if the license of the software suite is to be transferred to a different machine, to be deactivated, etc., the logic to perform this operation may check for the existence of a certain file. Upon determining that this file exists, the logic may perform the same operation to the license of the software A product 510. The flow continues at block 1012.

At block 1012, the client activation logic 512 activates the copy of the software suite. The client activation logic 512 may activate the copy of the software suite by sending an activation message to the activation logic 603 on the server 504. The activation logic 603 on the server 504 may determine whether the copy of the software suite may be activated. For example, individual data structures may be stored in the activation data structures 606 for the software suite. These individual data structures may include activation counters for the different copies of the software suites that are tracked based on serial numbers (similar to the activation counters for the individual software products). Therefore, if the copy of the software suite has already been activated for a set limit, the activation logic 603 may deny activation and transmit a deny message back to the machine 502. If the copy of the software suite is below the set limit, the activation logic 603 updates its number of activations for this copy of the software suite and sends an activation message back to the machine 502. Therefore, in some embodiments, delayed updates may be performed for the activation counters for the software suites.

Embodiments are not limited to the operations shown in the flow diagram 1000. For example, in some embodiments, the activation of the software suite may cause the adoption of the individual copy of the software product but not cause the deactivation of the individual copy of the software product. Alternatively, in some embodiments, the activation of the software suite may cause the deactivation of the individual copy of the software product, but not cause the adoption of the individual copy of the software product.

Figure 11:
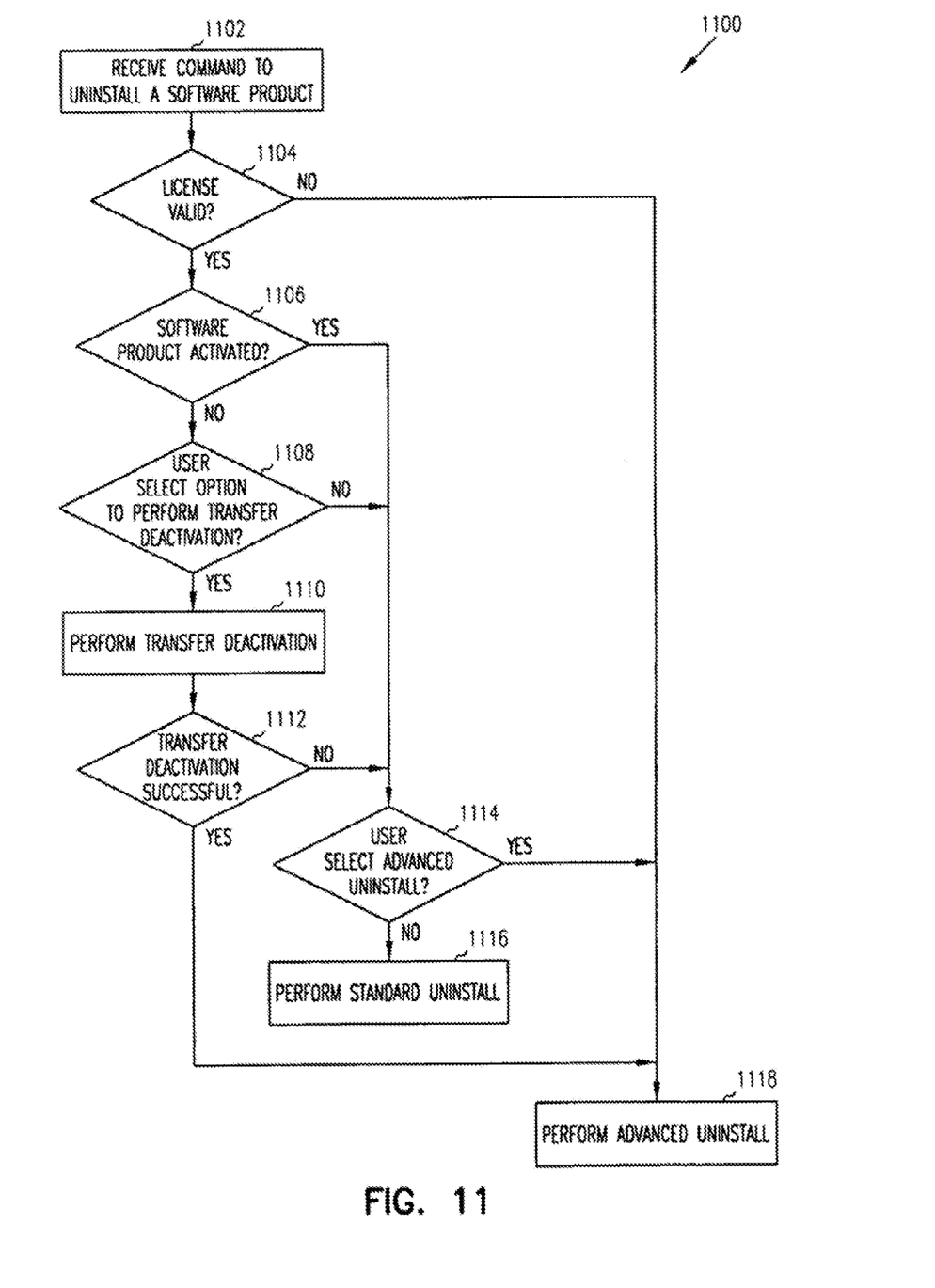
FIG. 11 illustrates a flow diagram for software uninstallation that integrates transfer activation, according to some embodiments of the invention.

A more detailed description of software uninstallation that integrates transfer activation, which updates the activation counter, according to some embodiments, is now described. A delayed update of the activation counter may then be performed based on the operations shown in the flow diagram 900 of FIG. 9. FIG. 11 illustrates a flow diagram for software uninstallation that integrates transfer activation, according to some embodiments of the invention. The flow diagram 1100 is described with reference to the components of FIGS. 5-7. The flow diagram 1100 commences at block 1102.

At block 1102, the uninstall logic 702 receives a command to uninstall a software product that is installed on the machine 102. For example, the command may be generated from an uninstall application that is executed by a user of the machine 502 to uninstall the software product A 510. The flow continues at block 1104.

At block 1104, the license validation logic 704 determines whether the license of the software product A 510 is valid. Once the command to uninstall is received, the uninstall logic 702 may call the license validation logic 704 to perform this determination. The license validation logic 704 may make this determination by validating the license data 708. For example, the license validation logic 704 may check whether a valid value is stored for the license in the license data 708. Upon determining that the license of the software product A 510 is not valid, the flow continues at block 1118, which is described in more detail below. Upon determining that the license of the software product A 510 is valid, the flow continues at block 1106.

At block 1106, the license validation logic 704 determines whether the software product A 510 is activated. In some embodiments, the license validation logic 704 determines whether the anchor data 710 includes an indication that the software product A 510 has been activated. In some embodiments, the software product A 510 may be executed on the machine 502 for a trial period without requiring the software to be activated. This may be any predetermined time period (e.g., 30 days) from the time of installation. The data representative of this predetermined time period may be stored in the anchor data 710. Therefore, if the software product A 510 is not activated, the license validation logic 704 may check the anchor data 710 if the software product A 510 has been installed within the predetermined time period. In some embodiments, if the software product A 510 is activated or the software product A 510 has been installed within the predetermined time period, the license of the software product A 510 is considered activated. Upon determining that the software product A 510 is not activated, the flow continues at block 1112, which is described in more detail below. Upon determining that the software product A 510 is activated, the flow continues at block 1108.

At block 1108, the uninstall logic 702 determines whether the user (that initiated the uninstall) has selected an option to perform a transfer activation of the software product A prior to the uninstall. The uninstall logic 702 may cause a Graphical User Interface (GUI) window to be opened on a monitor of the device 102 that allows the user to make the selection. Upon determining that the user did not select the option to perform the transfer activation, the flow continues at block 1114, which is described in more detail below. Upon determining that the user did select the option to perform the transfer activation, the flow continues at block 1110.

At block 1110, the client activation logic 512 performs the transfer activation of the software product A 510. The client activation logic 512 may transmit a communication to the activation logic 603 on the server 504. The communication may include the serial number associated with the software product A 510 and the identification of the machine 502. The communication includes an indication that the software product A 510 is to be deactivated for the machine 502. As described above, the activation logic 603 may update the deactivation data structures 306 to reflect this deactivation. In some embodiments, based on the transfer activation, the activation logic 603 decrements the activation counter within the data structure for this software product. The activation logic 603 may transmit a communication back to the client activation logic 512 that is indicative of whether the transfer activation was successful. The flow continues at block 1112.

At block 1112, the client activation logic 512 determines whether the transfer activation of the software product A 510 was successful. The client activation logic 512 may make this determination based on if a successful communication is received back from the activation logic 603 of the server 504. The transfer activation may not be successful if the network 506 or the server 504 is not operational, if the data that the activation logic 603 is to update is not accessible, corrupted, etc., if the data transmitted over the network is corrupted, etc. Upon determining that the transfer activation was successful, the flow continues at block 1118, which is described in more detail below. Upon determining that the transfer activation was not successful, the flow continues at block 1114.

At block 1114, the uninstall logic 702 determines whether the user selected an advanced uninstall of the software product A 510. The uninstall logic 702 may cause a GUI window to be opened on a monitor of the device 502 that allows the user to make the selection. Upon determining that the user did select the advanced uninstall, the flow continues at block 1118, which is described in more detail below. Upon determining that the user did not select the advanced uninstall, the flow continues at block 1116.

At block 1116, the uninstall logic 702 performs the standard uninstall of the software product A 510. As part of the standard uninstall, the uninstall logic 702 may remove application files, update registry data, etc. However, the uninstall logic 702 does not remove the data related to the activation of the copy of the software product A 510 and the anchor data 710. Accordingly, the standard uninstall operation preserves the activation data on the machine, which allows users to reinstall the copy of the software product A 510 without reactivating of the software. A standard uninstall operation may be executed for users who plan on re-installing the software product on the same machine. The flow diagram 1100 is then complete.

At block 1118, the uninstall logic 702 performs the advanced uninstall of the software product A 510. As part of the advanced uninstall, the uninstall logic 702 may remove application files, update registry data, etc. In addition, the uninstall logic 702 may remove the activation data. In some embodiments, the uninstall logic 702 may remove all data and files associated with the software product A, except for the data (stored in the anchor data 710) that indicates that the software has been installed and time of installation. Such data may remain to preclude users from cyclically installing and uninstalling the software to stay within the trial period and continuing using the product beyond its intended use as a trial. Accordingly, the users are required to activate the software. The user may select the advanced uninstall operation if the trial period has expired and the user has not activated the software. The user may also select the advanced uninstall operation if the user has already transferred the activation. The user may select the advanced uninstall operation if the license of the software is corrupt and requires reactivation. The flow diagram 1100 is then complete.

Embodiments are not limited to the operations shown in the flow diagram 1100. For example, in some embodiments, if the software product is part of a software suite, a transfer activation may not be performed. Rather, a standard uninstall of the software product is performed without a transfer activation.

Architecture for Delayed Validation of a Software License and Activation

An embodiment wherein software performs operations related to delayed validation for software licensing and activation as described herein is now described. In particular, FIG. 12 illustrates a computer device that executes software for performing operations related to delayed validation for software licensing and activation, according to some embodiments of the invention. FIG. 12 illustrates a computer device 1200 that may be representative of the application server 102, the utility server 104, the clients 106A-106N, the machine 502 or the server 504.

As illustrated in FIG. 12, the computer system 1200 comprises processor(s) 1202. The computer system 1200 also includes a memory unit 1230, processor bus 1222, and Input/Output controller hub (ICH) 1224. The processor(s) 1202, the memory unit 1230, and the ICH 1224 are coupled to the processor bus 1222. The processor(s) 1202 may comprise any suitable processor architecture. The computer system 1200 may comprise one, two, three, or more processors, any of which may execute a set of instructions in accordance with embodiments of the invention.

The memory unit 1230 may store data and/or instructions, and may comprise any suitable memory, such as a random access memory (DRAM). For example, the memory 1230 may be a Synchronous RAM (SRAM), a Synchronous Dynamic RAM (SDRAM), DRAM, a double data rate (DDR) Synchronous Dynamic RAM (SDRAM), etc. The computer system 1200 also includes IDE drive(s) 1208 and/or other suitable storage devices. A graphics controller 1204 controls the display of information on a display device 1206, according to some embodiments of the invention.

The input/output controller hub (ICH) 1224 provides an interface to I/O devices or peripheral components for the computer system 1200. The ICH 1224 may comprise any suitable interface controller to provide for any suitable communication link to the processor(s) 1202, memory unit 1230 and/or to any suitable device or component in communication with the ICH 1224. In some embodiments, the ICH 1224 provides suitable arbitration and buffering for each interface.

For some embodiments of the invention, the ICH 1224 provides an interface to one or more suitable integrated drive electronics (IDE) drives 1208, such as a hard disk drive (HDD) or compact disc read only memory (CD ROM) drive, or to suitable universal serial bus (USB) devices through one or more USB ports 1210. For one embodiment, the ICH 1224 also provides an interface to a keyboard 1212, mouse 1214, CD-ROM drive 1218, or other suitable devices through one or more firewire ports 1216. In some embodiments, the ICH 1224 also provides a network interface 1220 through which the computer system 1200 can communicate with other computers and/or devices. The ICH 1224 is connected to a wireless interface, which enables the computer system 1200 to wirelessly connect to computing devices using any suitable wireless communication protocol (e.g., 802.11b, 802.11g, etc.).

In some embodiments, the computer system 1200 includes a machine-readable medium that stores a set of instructions (e.g., software) embodying any one, or all, of the methodologies described herein. Furthermore, software may reside, completely or at least partially, within memory unit 1230 and/or within the processor(s) 1202.

With reference to FIGS. 2, 5-7, the memory 1230 and/or one of the IDE/ATA drives 1208 may store the rendering logic 202, the license validation logic 204, the software product A 510, the client activation logic 512, the counter update logic 602, the activation logic 603, the uninstall logic 702, the license validation logic 704, the license data 708 and the anchor data 710. In some embodiments, the rendering logic 202, the license validation logic 204, the software product A 510, the client activation logic 512, the counter update logic 602, the activation logic 603, the uninstall logic 702 and the license validation logic 704 may be instructions executing within the processor(s) 1202. The rendering logic 202, the license validation logic 204, the client activation logic 512, the counter update logic 602, the activation logic 603, the uninstall logic 702 and the license validation logic 704 may be stored in a machine-readable medium that are a set of instructions (e.g., software) embodying any one, or all, of the methodologies described herein. For example, the rendering logic 202, the license validation logic 204, the client activation logic 512, the counter update logic 602, the activation logic 603, the uninstall logic 702 and the license validation logic 704 may reside, completely or at least partially, within the memory 1230, the processor(s) 1202, one of the IDE/ATA drive(s) 1208, etc.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for delayed validation for software licensing and activation, in accordance with some embodiments of the invention. A number of figures show flow diagrams that illustrate the operations for delayed validation for software licensing and activation, in accordance with some embodiments of the invention. The operations of the flow diagram are described with references to the systems/apparatus shown in the block diagrams. However, it should be understood that the operations of the flow diagram could be performed by embodiments of systems and apparatus other than those discussed with reference to the block diagrams, and embodiments discussed with reference to the systems/apparatus could perform operations different than those discussed with reference to the flow diagram.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A computer-implemented method comprising:
   at a server computer:
   in response to receiving a plurality of requests to access a plurality of templates using a software application, wherein the plurality of requests is received from one or more client computers, and wherein the plurality of templates is used to render documents, providing the access to the plurality of templates via the software application;
   subsequent to providing the access to the plurality of templates via the software application, performing a delayed license validation of the software application by determining, at a processor of the server computer, whether licenses are required for the access to the plurality of templates via the software application, wherein a license is required when a substantive modification is made to a template; and
   determining whether a number of licenses required for the access to the plurality of templates via the software application exceeds an allowed number of licenses for the software application, wherein:
   if the number of licenses required for the access to the plurality of templates via the software application exceeds the allowed number of licenses for the software application, a subsequent template access request is denied, and
   if the number of licenses required for the access to the plurality of templates via the software application does not exceed the allowed number of licenses for the software application, the subsequent template access request is allowed.

2. The method of claim 1, wherein the plurality of request to access the plurality of templates comprises a plurality of requests to render the plurality of templates in an accessible format.

3. The method of claim 2, wherein the accessible format is a portable document format.

4. The method of claim 1, wherein determining whether the licenses are required for the access to the plurality of templates occurs at an off-peak time.

5. The method of claim 1, wherein the substantive modification comprises an addition of a new field to the template.

6. The method of claim 1, wherein the substantive modification comprises a modification of a field included in the template.

7. The method of claim 6, wherein the modification of the field comprises creating a reference to a new database location for populating the field.

8. The method of claim 1, wherein the license is required when a degree of modification that is made to the template exceeds a predetermined level.

9. Non-transitory computer storage media having computer-executable instructions embodied thereon that, when executed by a server computer having a processor and a memory, cause the server computer to perform a method comprising:
- in response to receiving a plurality of requests to access a plurality of templates using a software application, wherein the plurality of requests is received from one or more client computers, and wherein the plurality of templates is used to render documents, providing the access to the plurality of templates via the software application;
- subsequent to providing the access to the plurality of templates via the software application, performing a delayed license validation of the software application by determining, at the processor of the server computer, whether licenses are required for the access to the plurality of templates via the software application, wherein a license is required when a substantive modification is made to a template; and
- determining whether a number of licenses required for the access to the plurality of templates via the software application exceeds an allowed number of licenses for the software application, wherein:
- if the number of licenses required for the access to the plurality of templates via the software application exceeds the allowed number of licenses for the software application, a subsequent template access request is denied, and
- if the number of licenses required for the access to the plurality of templates via the software application does not exceed the allowed number of licenses for the software application, the subsequent template access request is allowed.

10. The media of claim 9, wherein determining whether the licenses are required for the access to the plurality of templates occurs at an off-peak time.

11. The media of claim 9, wherein the license is required when a degree of modification that is made to the template exceeds a predetermined level.

12. The media of claim 9, wherein the substantive modification comprises an addition of a new field to the template.

13. The media of claim 9, wherein the substantive modification comprises a modification of a field included in the template.

14. The media of claim 13, wherein the modification of the field comprises creating a reference to a new database location for populating the field.

15. A computer system comprising:
- one or more computer processors; and
- one or more computer storage media storing computer-executable instructions that, when executed by the one or more computer processors, are configured to:
- in response to receiving a plurality of requests to access a plurality of templates using a software application, wherein the plurality of requests is received from one or more client computers, and wherein the plurality of templates is used to render documents, provide the access to the plurality of templates via the software application,
- subsequent to providing the access to the plurality of templates via the software application, perform a delayed license validation of the software application by determining, at the one or more computer processors, whether licenses are required for the access to the plurality of templates via the software application, wherein a license is required when a substantive modification is made to a template, and
- determine whether a number of licenses required for the access to the plurality of templates via the software application exceeds an allowed number of licenses for the software application, wherein:
- if the number of licenses required for the access to the plurality of templates via the software application exceeds the allowed number of licenses for the software application, a subsequent template access request is denied, and
- if the number of licenses required for the access to the plurality of templates via the software application does not exceed the allowed number of licenses for the software application, the subsequent template access request is allowed.

16. The computer system of claim 15, wherein determining whether the licenses are required for the access to the plurality of templates occurs at an off-peak time.

17. The computer system of claim 15, wherein the substantive modification comprises an addition of a new field to the template.

18. The computer system of claim 15, wherein the substantive modification comprises a modification of a field included in the template, the modification of the field comprises creating a reference to a new database location for populating the field.

19. The computer system of claim 15, wherein the one or more computer storage media store computer-executable instructions that, when executed by the one or more computer processors, are further configured to:
- determine whether a template copy is stored in a template table, and if the template copy is not stored in the template table, store the template copy in the template table, and
- subsequent to providing the access to the plurality of templates via the software application, access the template copy stored in the template table to determine whether the licenses are required for the access to the plurality of templates via the software application.

20. The computer system of claim 19, wherein the one or more computer storage media store computer-executable instructions that, when executed by the one or more computer processors, are further configured to:
- calculate a hash associated with the template copy stored in the template table,
- compare the calculated hash with an original hash associated with an original template version, and
- based on a difference between the calculated hash and the original hash, determine the licenses are required for the access to the plurality of templates via the software application.

* * * * *